(12) United States Patent
Kim et al.

(10) Patent No.: US 11,834,024 B2
(45) Date of Patent: Dec. 5, 2023

(54) NON-HYDRAULIC PEDAL SIMULATOR

(71) Applicant: HYUNDAI MOBIS CO., LTD., Seoul (KR)

(72) Inventors: Jin Hyun Kim, Yongin-si (KR); Myeon Gyu Cha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/874,799

(22) Filed: Jul. 27, 2022

(65) Prior Publication Data

US 2023/0145896 A1 May 11, 2023

(30) Foreign Application Priority Data

Nov. 9, 2021 (KR) ........................ 10-2021-0152988

(51) Int. Cl.
*B60T 7/06* (2006.01)
*G05G 1/44* (2008.04)
*G05G 5/03* (2008.04)

(52) U.S. Cl.
CPC .................. *B60T 7/06* (2013.01); *G05G 1/44* (2013.01); *G05G 5/03* (2013.01)

(58) Field of Classification Search
None
See application file for complete search history.

(56) References Cited

U.S. PATENT DOCUMENTS

| | | | |
|---|---|---|---|
| 8,376,098 B2 * | 2/2013 | Campbell | B60K 26/021 188/265 |
| 10,948,941 B2 * | 3/2021 | Dohmen | B60T 7/06 |
| 2002/0117893 A1 * | 8/2002 | Shaw | B60T 8/3255 188/151 A |

FOREIGN PATENT DOCUMENTS

| | | | | |
|---|---|---|---|---|
| KR | 10-2014-0030227 A | | 3/2014 | |
| WO | WO-2021172915 A1 | * | 9/2021 | ............ B60T 13/741 |

* cited by examiner

*Primary Examiner* — Vicky A Johnson
(74) *Attorney, Agent, or Firm* — Morgan, Lewis & Bockius LLP (57) ABSTRACT

A non-hydraulic pedal simulator may include: a housing part; a piston part inserted into the housing part, and moveable in connection with a pedal rod part; a mounting reaction part mounted on the piston part; a support reaction part inserted into the housing part, disposed on a moving path of the mounting reaction part, and configured to support the mounting reaction part; and a moving reaction part disposed between the piston part and the support reaction part, configured to elastically support the piston part, and supported by the support reaction part while being moved by the piston part.

19 Claims, 12 Drawing Sheets

NON-HYDRAULIC PEDAL SIMULATOR

CROSS-REFERENCE TO RELATED APPLICATION

This application claims priority from and the benefit of Korean Patent Application No. 10-2021-0152988, filed on Nov. 9, 2021, which is hereby incorporated by reference for all purposes as if set forth herein.

BACKGROUND

Field

Exemplary embodiments of the present disclosure relate to a non-hydraulic pedal simulator, and more particularly, to a non-hydraulic pedal simulator which can implement a pedal force without using hydraulic pressure.

Discussion of the Background

In general, a braking apparatus refers to a brake system in which an ECU (Electronic Control Unit) senses that a driver steps on a brake pedal, and operates a hydraulic pressure generation unit to supply hydraulic pressure to a master cylinder, such that brake hydraulic pressure is transferred to a wheel cylinder of each wheel to generate a brake force.

In such a brake system, when the driver steps on the brake pedal during normal braking, a pedal displacement sensor senses a displacement of the brake pedal. The ECU operates the hydraulic pressure generation unit to supply operating oil, stored in an operating oil storage place, to a boost chamber of the master cylinder, thereby forming pressure in the master cylinder. The pressure in the master cylinder, formed in such a manner, generates brake hydraulic pressure by pressing a piston of the master cylinder. This brake hydraulic pressure is transferred to the wheel cylinder to generate a brake force.

At this time, when the pressure of the master cylinder is changed during regenerative braking, a force is transferred to the brake pedal as it is, which causes a bad influence on pedal feeling. When the pedal feeling is degraded, there occurs a gap between the pedal feeling of the driver during braking and how much the brake disk is actually pressed by the brake pad in the wheel cylinder. In this case, braking may be excessively or minimally performed to cause the frequent replacement of consumable parts such as the brake pad, and a safety accident of a vehicle may occur with sudden braking or non-braking. Thus, there is a demand for a device capable of solving such a problem.

The related art of the present disclosure is disclosed in Korean Patent Application Publication No. 2014-0030227 published on Mar. 11, 2014 and entitled "Pedal Travel Simulator, Actuating Unit for Hydraulic Brake System and Brake System."

SUMMARY

Various embodiments are directed to a non-hydraulic pedal simulator which can implement a pedal force without using hydraulic pressure.

In an embodiment, a non-hydraulic pedal simulator may include: a housing part; a piston part inserted into the housing part, and moveable in connection with a pedal rod part; a mounting reaction part mounted on the piston part; a support reaction part inserted into the housing part, disposed on a moving path of the mounting reaction part, and configured to support the mounting reaction part; and a moving reaction part disposed between the piston part and the support reaction part, configured to elastically support the piston part, and supported by the support reaction part while being moved by the piston part.

The piston part may include: a piston body part inserted into the housing part; a piston induction part extending from one side of the piston body part such that the pedal rod part is inserted into the piston induction part; a piston mounting part extending from another side of the piston body part, such that the mounting reaction part is inserted into the piston mounting part; a piston sealing part mounted on a circumference of the piston body part, and brought into close contact with the housing part; and a piston stopper part mounted on the housing part, and configured to prevent separation of the piston body part.

The mounting reaction part may be press-fitted into the piston part and exposed to an outside of the piston part, and made of an elastic material.

The support reaction part may include: a support base part embedded in the housing part; a support rod part coupled to the support base part, and extending toward the mounting reaction part; and a support plate part coupled to an end of the support rod part, and configured to support the mounting reaction part.

The support rod part may be insert-molded in the support base part.

The support reaction part may further include a support elastic part penetrated by the support rod part, press-fitted into the support base part, made of an elastic material, and configured to provide a reaction force.

The moving reaction part may include: a moving support part moveable by the pressing of the piston part; and a moving spring part disposed between the moving support part and the support reaction part, and configured to support the moving support part by using a spring force.

The non-hydraulic pedal simulator may further include: a magnetic force generator disposed in any one or more of the pedal rod part, the piston part, or the moving reaction part, and configured to generate a magnetic force; and a position detector mounted in the housing part, and configured to detect a position of the magnetic force generator.

The non-hydraulic pedal simulator may be characterized in that the moving reaction part is pressed to generate a primary pedal force as the piston part is moved, the support reaction part presses the mounting reaction part to generate a secondary pedal force as the piston part is additionally moved, and the moving reaction part presses the support reaction part to generate a tertiary pedal force as the piston part is still further moved.

The non-hydraulic pedal simulator in accordance with the embodiment of the present disclosure may sequentially increase the reaction forces through the mounting reaction part, the support reaction part, and the moving reaction part while the piston part is moved as a driver presses the pedal. Thus, the non-hydraulic pedal simulator may provide the driver with brake feeling similar to that generated by an existing hydraulic booster, even though an electronic booster is used.

DETAILED DESCRIPTION OF THE ILLUSTRATED EMBODIMENTS

Hereinafter, a non-hydraulic pedal simulator will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
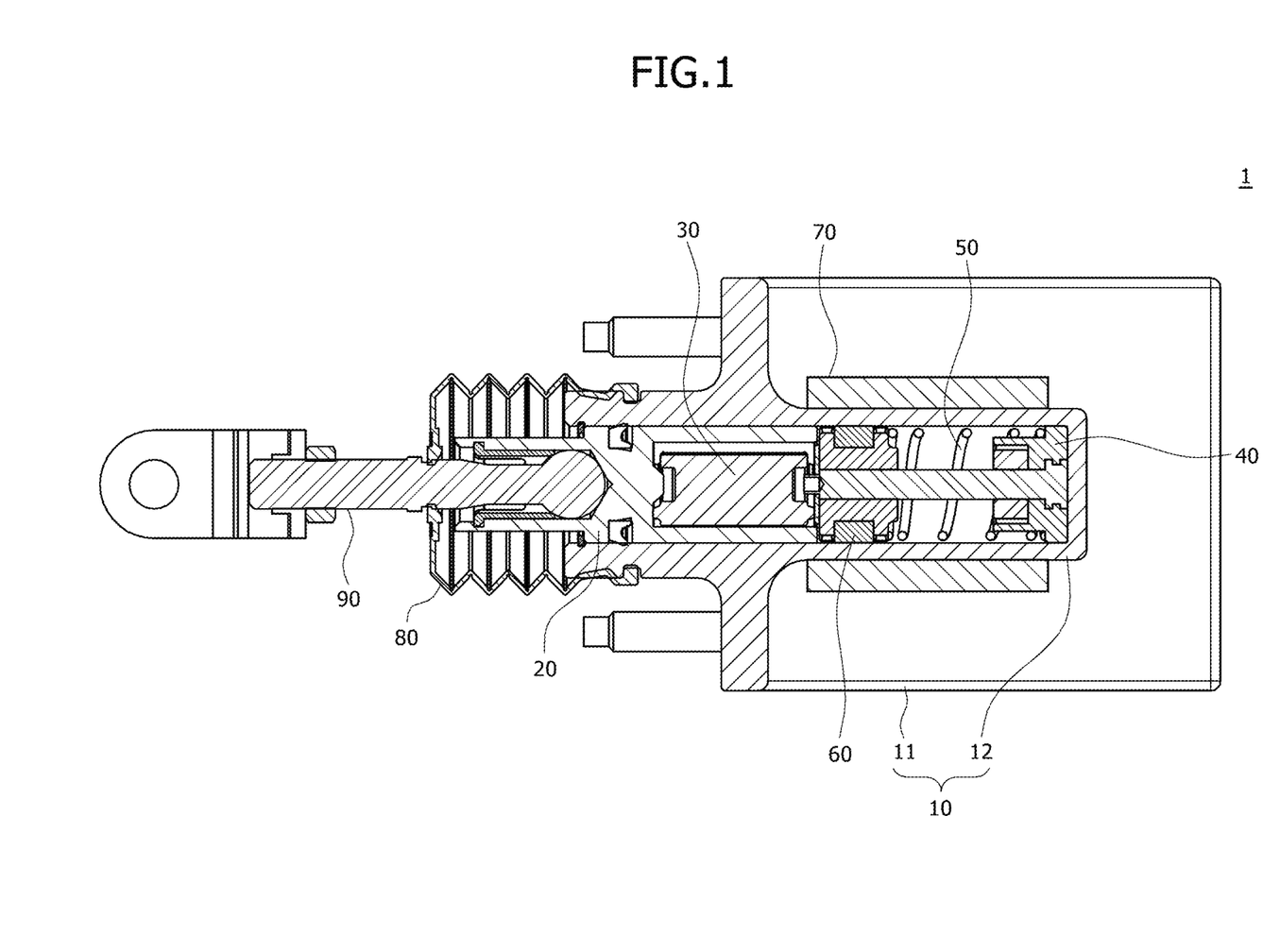
FIG. 1 is a diagram schematically illustrating a non-hydraulic pedal simulator in accordance with an embodiment of the present disclosure.

FIG. 1 is a diagram schematically illustrating a non-hydraulic pedal simulator in accordance with an embodiment of the present disclosure. Referring to FIG. 1, a non-hydraulic pedal simulator 1 in accordance with an embodiment of the present disclosure includes a housing part 10, a piston part 20, a mounting reaction part 30, a support reaction part 40, and a moving reaction part 50.

The housing part 10 is mounted on a vehicle body. For example, the housing part 10 may include a housing body part 11 mounted on the vehicle body and a housing insertion part 12 formed in the housing body part 11 and having a space formed in the longitudinal direction of the housing body part 11 such that the piston part 20, the mounting reaction part 30, the support reaction part 40, and the moving reaction part 50 are embedded in the space. A pedal rod part 90 may be inserted into an end of the housing insertion part 12, and a corrugated cover part 80 that covers the housing insertion part 12 and the pedal rod part 90 may block the introduction of foreign matters.

The piston part 20 is inserted into the housing part 10, and moved in connection with the pedal rod part 90. For example, the piston part 20 may be coupled to the pedal rod part 90. When a driver steps on a pedal, the pedal rod part 90 may be moved to move the piston part 20.

The mounting reaction part 30 is mounted in the piston part 20. For example, the mounting reaction part 30 may be made of an elastic material to provide a reaction force while supported by the support reaction part 40.

The support reaction part 40 is inserted into the housing part 10, and disposed on a movement path of the mounting reaction part 30 so as to support the mounting reaction part 30. For example, the support reaction part 40 may be embedded in the housing part 10, and maintain a fixed state thereof. The support reaction part 40 may provide an additional reaction force by the pressurization of the moving reaction part 50.

The moving reaction part 50 is disposed between the piston part 20 and the support reaction part 40, elastically supports the piston part 20, and is supported by the support reaction part 40 while moved by the piston part 20. For example, the moving reaction part 50 may provide a reaction force by a spring force while pressed by the piston part 20. Furthermore, the moving reaction part 50 may press the support reaction part 40 while moved.

Figure 2:
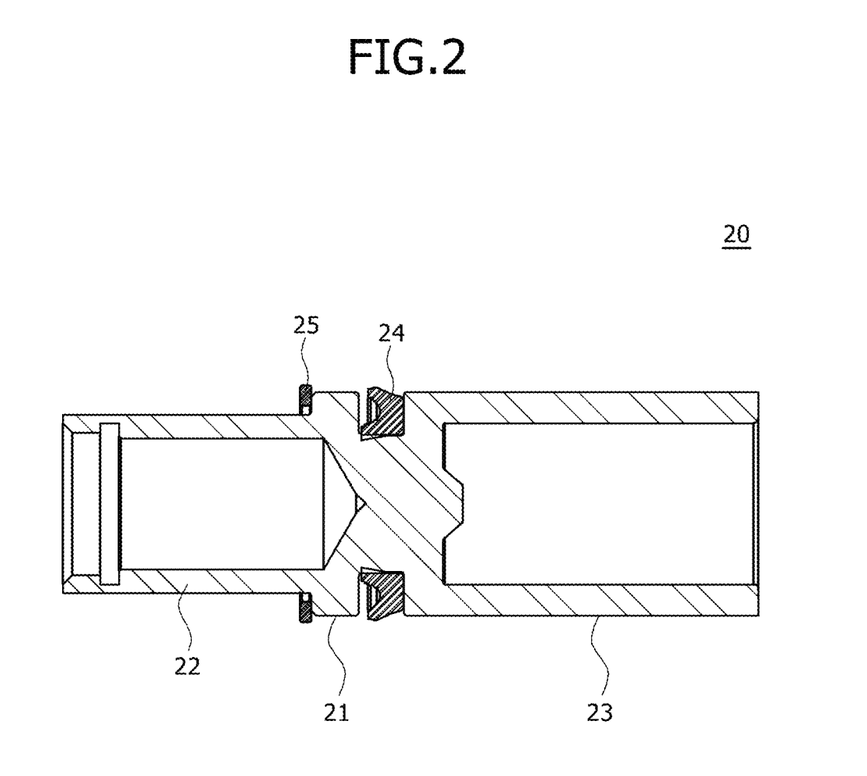
FIG. 2 is a diagram schematically illustrating a piston part in accordance with the embodiment of the present disclosure.

FIG. 2 is a diagram schematically illustrating the piston part in accordance with the embodiment of the present disclosure. Referring to FIG. 2, the piston part 20 in accordance with the embodiment of the present disclosure includes a piston body part 21, a piston induction part 22, a piston mounting part 23, a piston sealing part 24, and a piston stopper part 25.

The piston body part 21 is inserted into the housing part 10. For example, the piston body part 21 is disposed in the center of the piston part 20, and inserted into the housing insertion part 12.

The piston induction part 22 is extended from one side of the piston body part 21, such that the pedal rod part 90 is inserted into the piston induction part 22. For example, the piston induction part 22 may have a pipe shape into which the pedal rod part 90 can be inserted. The piston induction part 22 may be coupled to the pedal rod part 90 through a pin.

The piston mounting part 23 is extended from the other side of the piston body part 21, and the mounting reaction part 30 is inserted into the piston mounting part 23. For example, the piston mounting part 23 may have a pipe shape into which the mounting reaction part 30 can be press-fitted. The mounting reaction part 30 inserted into the piston mounting part 23 may maintain the state in which the surface thereof is exposed to the outside.

The piston sealing part 24 is mounted on the circumference of the piston body part 21, and comes into close contact with the housing part 10. For example, the piston sealing part 24 may be made of an elastic material such as rubber, and inserted into a groove formed along the circumference of the piston body part 21 so as to come into close contact with the inside of the housing insertion part 12.

The piston stopper part 25 is mounted on the housing part 10, and prevents the separation of the piston body part 21. For example, the piston stopper part 25 may be formed in a band shape to surround the piston induction part 22, and fixed to the housing insertion part 12 so as to prevent an unintended separation of the piston body part 21 from the housing part 10.

The mounting reaction part 30 in accordance with the embodiment of the present disclosure is press-fitted into the piston part 20 so as to be exposed to the outside, and formed of an elastic material. For example, the mounting reaction part 30 may be press-fitted into the piston mounting part 23.

The mounting reaction part 30 may not protrude to the outside, but be exposed to the outside while inserted into the piston mounting part 23. Between the mounting reaction part 30 and the piston mounting part 23, a space may be formed so that the mounting reaction part 30 provides a reaction force while expanded in a lateral direction by an external force.

Figure 3:
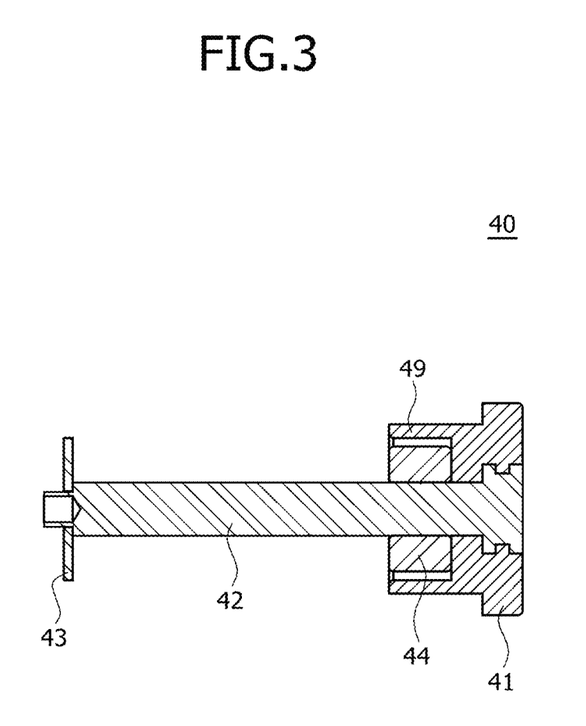
FIG. 3 is a diagram schematically illustrating a support reaction part in accordance with the embodiment of the present disclosure.

FIG. 3 is a diagram schematically illustrating the support reaction part in accordance with the embodiment of the present disclosure. Referring to FIG. 3, the support reaction part 40 in accordance with the embodiment of the present disclosure includes a support base part 41, a support rod part 42, and a support plate part 43.

The support base part 41 is embedded in the housing part 10. For example, the support base part 41 may be inserted into the housing insertion part 12 and fixed to the deepest position thereof.

The support rod part 42 is coupled to the support base part 41, and extended toward the mounting reaction part 30. For example, the support rod part 42 may have one end coupled to the support base part 41, and have a length in the longitudinal direction of the housing insertion part 12. The support rod part 42 may penetrate the moving reaction part 50. The support rod part 42 may be formed in the support base part 41 through insert-molding. For example, the support rod part 42 may be made of a metallic material, and the support base part 41 may be made of resin. The support rod part 42 and the support base part 41 may be formed as one body by insert molding.

The support plate part 43 is coupled to an end of the support rod part 42, and supports the mounting reaction part 30. For example, when the piston mounting part 23 is moved, the support plate part 43 may be inserted into the piston mounting part 23 and coupled to an end of the support rod part 42 through a bolt or rivet so as to support the mounting reaction part 30 embedded in the piston mounting part 23.

The support reaction part 40 in accordance with the embodiment of the present disclosure may further include a support elastic part 44. The support elastic part 44 is penetrated by the support rod part 42, press-fitted into the support base part 41, and made of an elastic material to provide a reaction force. For example, the support base part 41 may have a support insertion part 49 formed to face the mounting reaction part 30, and the support elastic part 44 inserted into the support insertion part 49 may provide an additional reaction force. Between the support elastic part 44 and the support insertion part 49, a space may be formed so that the support elastic part 44 provides a reaction force while expanded in a lateral direction by an external force.

Figure 4:
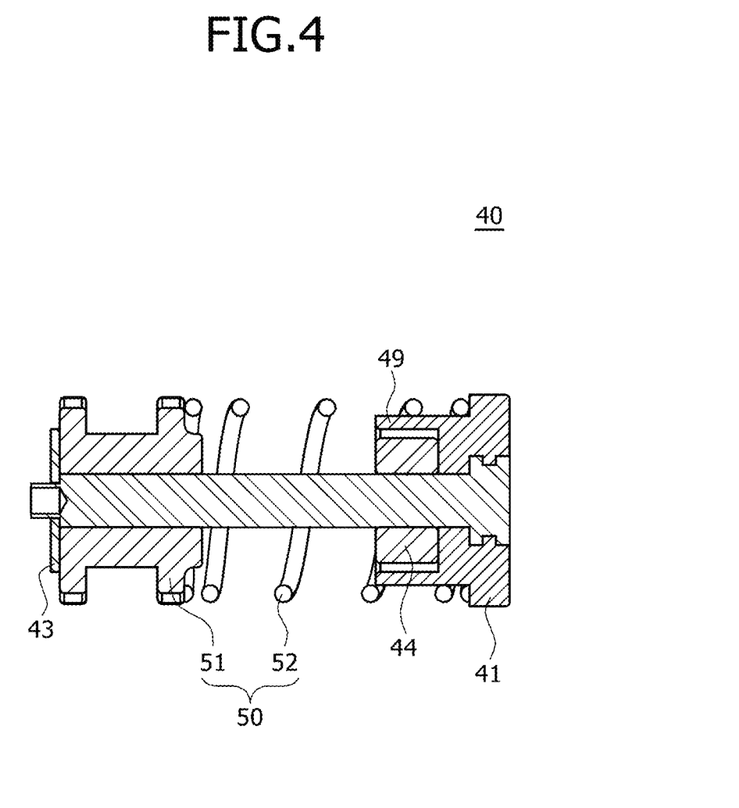
FIG. 4 is a diagram schematically illustrating a moving reaction part in accordance with the embodiment of the present disclosure.

FIG. 4 is a diagram schematically illustrating the moving reaction part in accordance with the embodiment of the present disclosure. Referring to FIG. 4, the moving reaction part 50 in accordance with the embodiment of the present disclosure includes a moving support part 51 and a moving spring part 52.

The moving support part 51 is moved by the pressing of the piston part 20. For example, the moving support part 51 may be penetrated by the support rod part 42, and brought into surface contact with the piston mounting part 23. When the pedal rod part 90 pushes the piston part 20, the piston part 20 may be pushed to move the moving support part 51 toward the support elastic part 44. When the moving support part 51 is moved by an external force so as to reach the support elastic part 44, the moving support part 51 may press the support elastic part 44 to provide a reaction force. The moving support part 51 may have a protruding end which is inserted into the support insertion part 49 so as to press the support elastic part 44.

The moving spring part 52 is disposed between the moving support part 51 and the support reaction part 40, and supports the moving support part 51 by using a spring force. For example, the moving spring part 52 may be formed in a coil spring shape and supported by the support base part 41 while surrounding the support elastic part 44, and support the edge of the moving support part 51. The moving support part 51 may be returned to the original position by the moving spring part 52.

Figure 5:
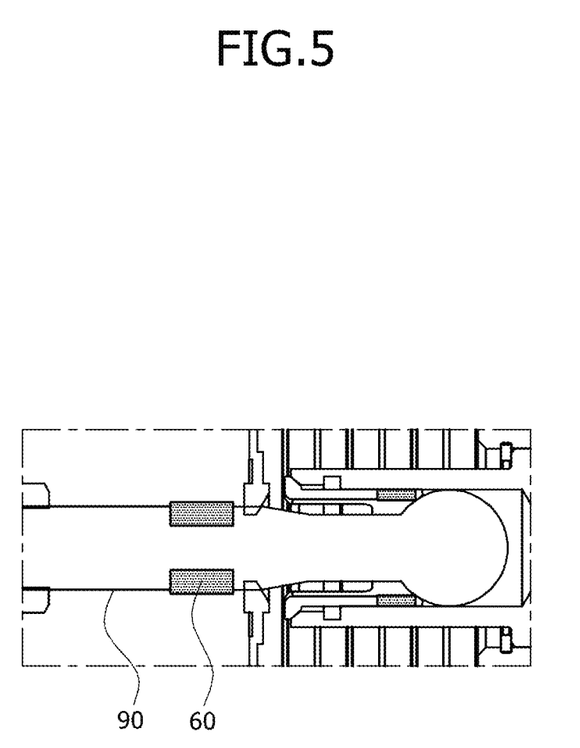
FIG. 5 is a diagram schematically illustrating that a magnetic force generator in accordance with a first embodiment of the present disclosure is disposed.
Figure 6:
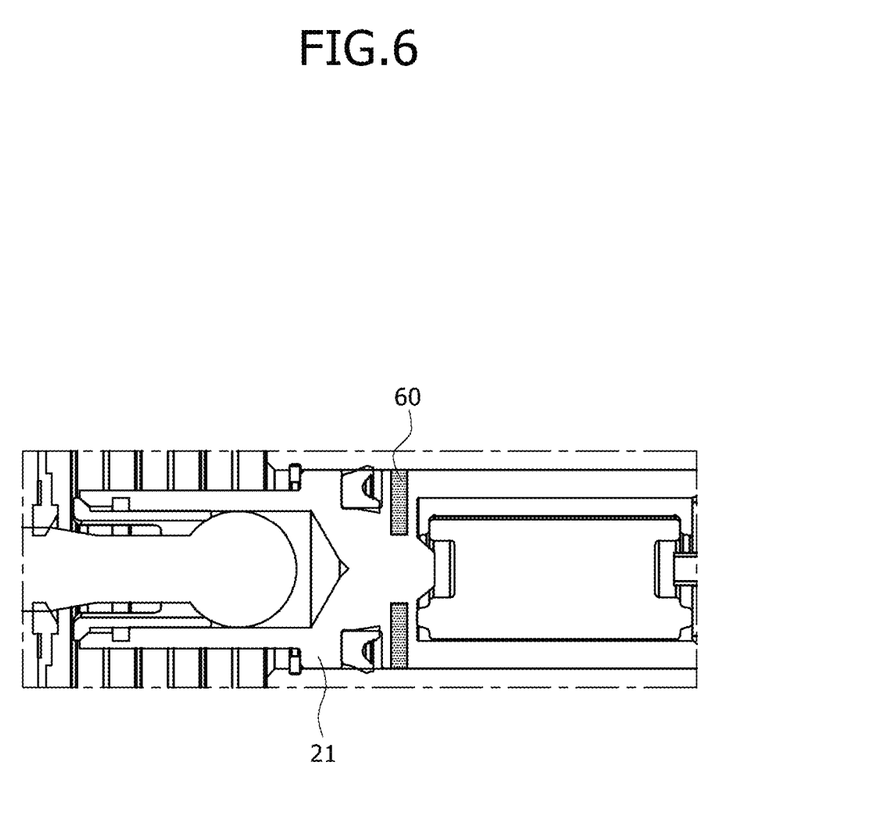
FIG. 6 is a diagram schematically illustrating that a magnetic force generator in accordance with a second embodiment of the present disclosure is disposed.
Figure 7:
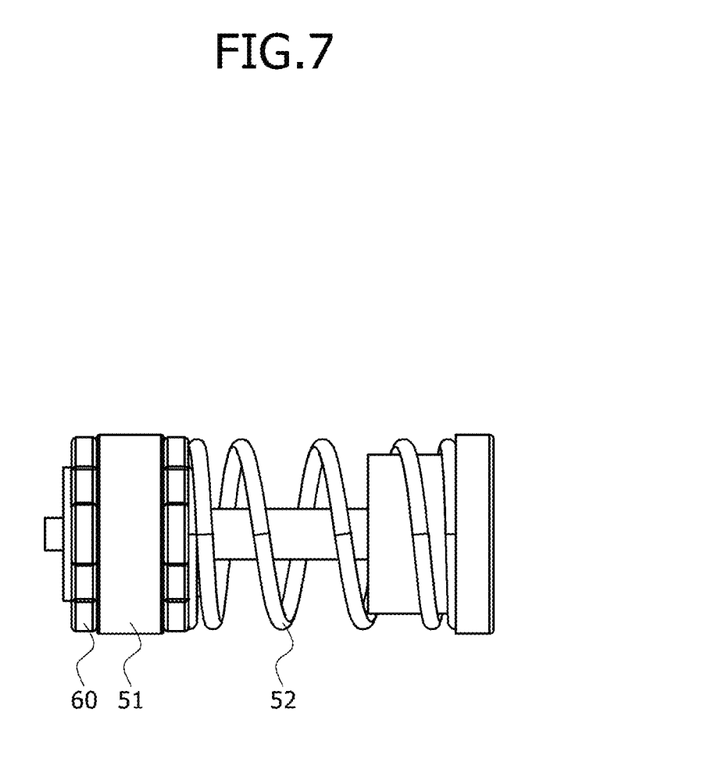
FIG. 7 is a diagram schematically illustrating that a magnetic force generator in accordance with a third embodiment of the present disclosure is disposed.

FIG. 5 is a diagram schematically illustrating that a magnetic force generator in accordance with a first embodiment of the present disclosure is disposed, FIG. 6 is a diagram schematically illustrating that a magnetic force generator in accordance with a second embodiment of the present disclosure is disposed, and FIG. 7 is a diagram schematically illustrating that a magnetic force generator in accordance with a third embodiment of the present disclosure is disposed. Referring to FIGS. 1 and 5 to 7, the non-hydraulic pedal simulator 1 in accordance with the embodiment of the present disclosure further includes a magnetic force generator 60 and a position detector 70.

The magnetic force generator 60 is disposed in any one or more of the pedal rod part 90, the piston part 20, and the moving reaction part 50, and serves to generate a magnetic force. The position detector 70 is mounted in the housing part 10, and serves to detect the position of the magnetic force generator 60.

One or more magnetic force generators 60 may be mounted on the pedal rod part 90 (FIG. 5), mounted on the piston body part 21 (FIG. 6), or mounted on the moving support part 51 (FIG. 7). The position detector 70 may be disposed outside the housing insertion part 12, measure the position of the magnetic force generator 60 in real time, and detect a stroke according to the position of the magnetic force generator 60.

Through the above-described configuration, the piston part 20 is moved to press the moving reaction part 50, thereby generating a primary pedal force. With the primary pedal force generated, the piston part 20 is additionally moved so that the support reaction part 40 additionally presses the mounting reaction part 30, thereby generating a secondary pedal force. With the secondary pedal force generated, the piston part 20 is additionally moved so that the moving reaction part 50 additionally presses the support reaction part 40, thereby generating a tertiary pedal force.

Figure 8:
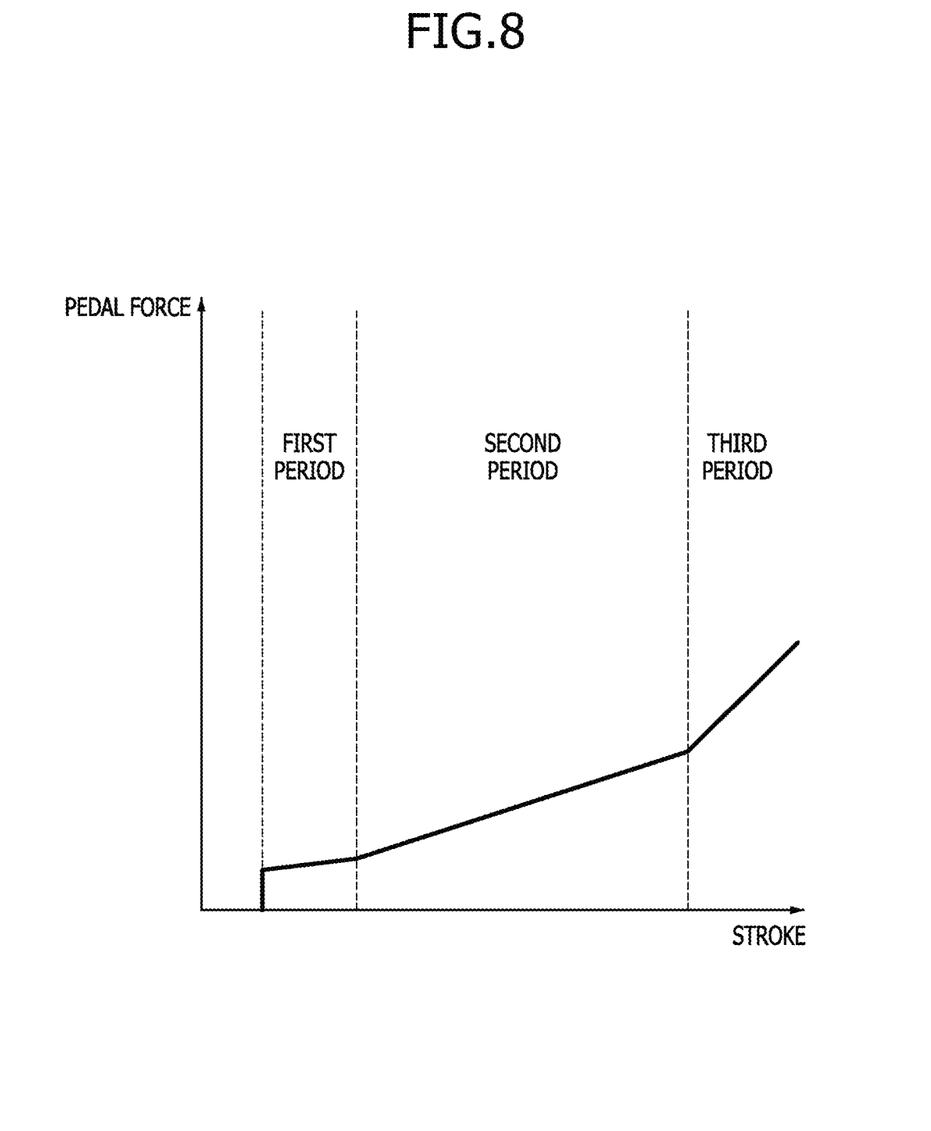
FIG. 8 is a graph schematically illustrating a pedal force for each period in the non-hydraulic pedal simulator in accordance with the embodiment of the present disclosure.
Figure 9:
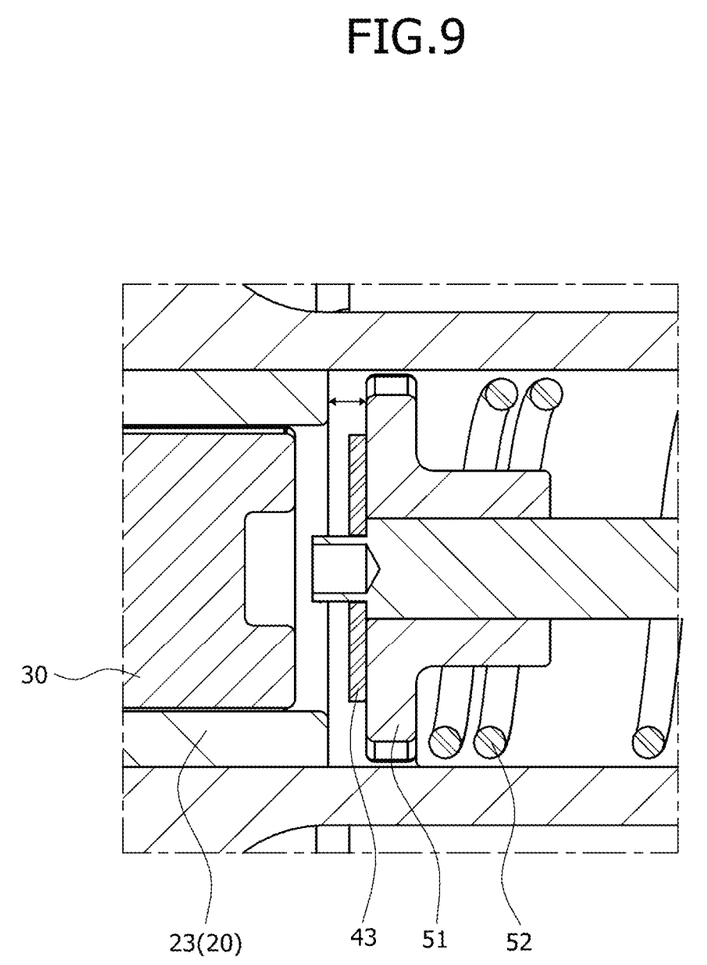
FIG. 9 is a diagram schematically illustrating the state of an invalid period in FIG. 8.
Figure 10:
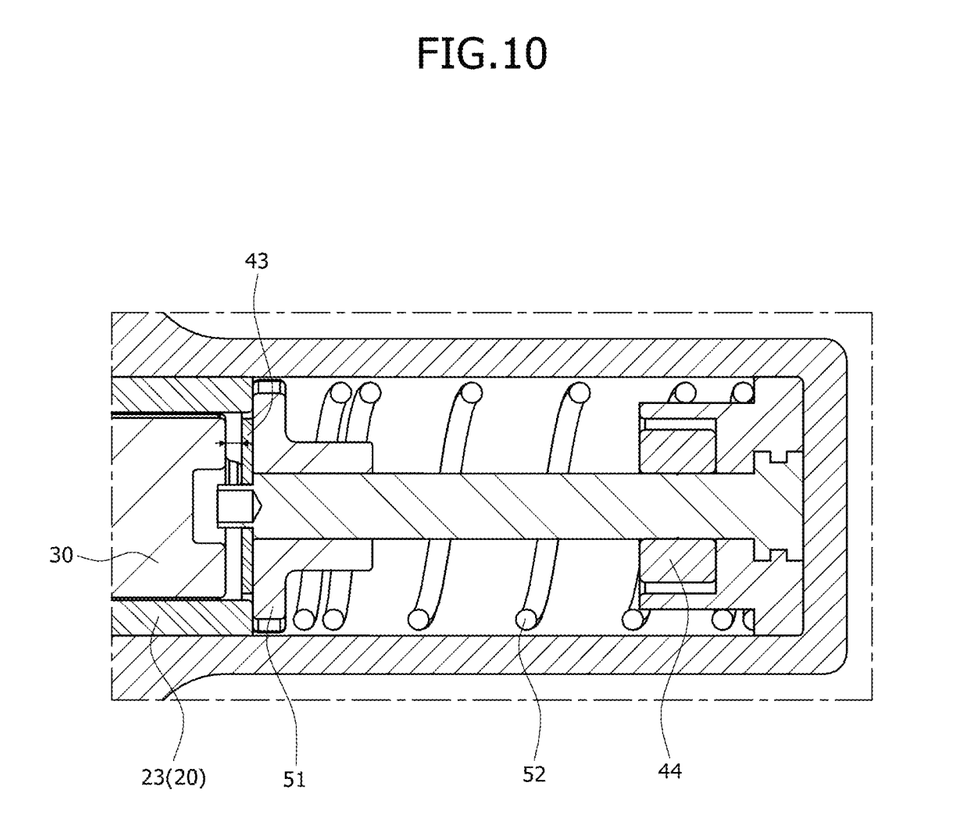
FIG. 10 is a diagram schematically illustrating the state of a first period in FIG. 8.
Figure 11:
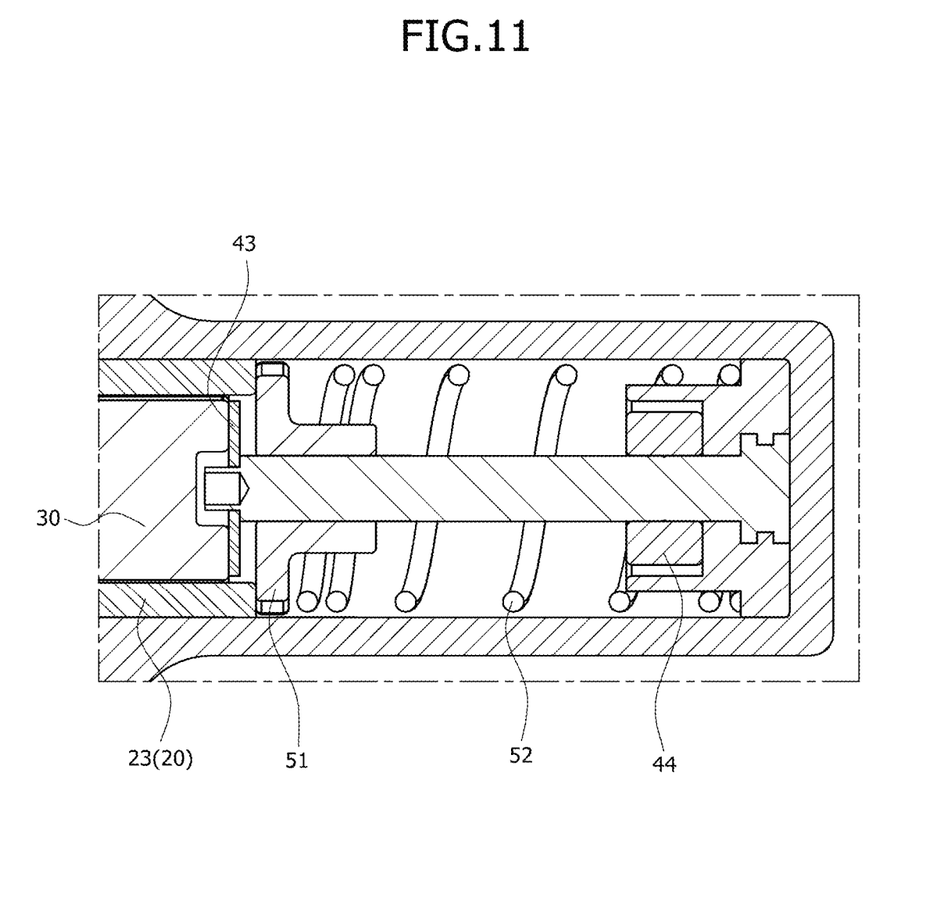
FIG. 11 is a diagram schematically illustrating the state of a second period in FIG. 8.
Figure 12:
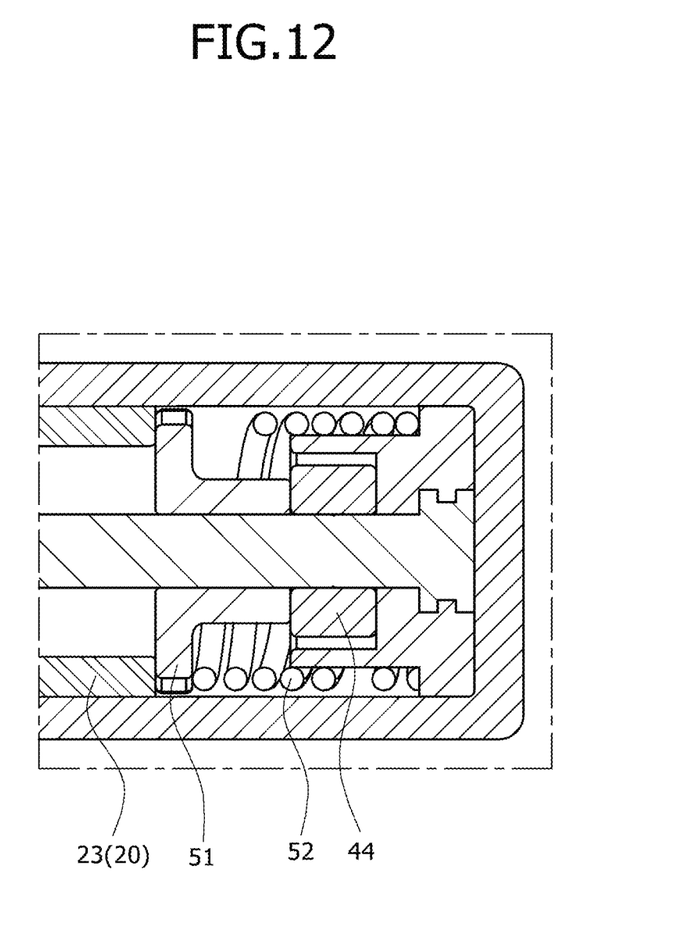
FIG. 12 is a diagram schematically illustrating the state of a third period in FIG. 8.

FIG. 8 is a graph schematically illustrating a pedal force for each period in the non-hydraulic pedal simulator in accordance with the embodiment of the present disclosure, and FIG. 9 is a diagram schematically illustrating the state of an invalid period in FIG. 8. FIG. 10 is a diagram schematically illustrating the state of a first period in FIG. 8, FIG. 11 is a diagram schematically illustrating the state of a second period in FIG. 8, and FIG. 12 is a diagram schematically illustrating the state of a third period in FIG. 8. Referring to FIGS. 8 to 12, an operation of the non-hydraulic pedal simulator 1 in accordance with the embodiment of the present disclosure will be described as follows.

When a driver steps on the pedal, the piston part 20 is moved by the pedal rod part 90. At this time, a period before the piston part 20 comes into contact with the moving support part 51 is an invalid period. In the invalid period, no pedal force is generated (see FIG. 9).

When a first period arrives as the pedal is continuously pressed, the moving spring part 52 is compressed to generate the primary pedal force while the moving support part 51 is moved by the piston part 20. The first period starts at the point of time that the moving spring part 52 is compressed, and lasts until the support plate part 43 reaches the mounting reaction part 30 (see FIG. 10).

When the second period following the first period arrives as the pedal is continuously pressed, the compression of the moving spring part 52 lasts while the piston part 20 is additionally moved, and the mounting reaction part 30 mounted on the piston part 20 is compressed by the fixed support plate part 43 so as to generate the secondary pedal force. The second period starts at the point of time that the mounting reaction part 30 is compressed, and lasts until the moving support part 51 reaches the support elastic part 44 (see FIG. 11).

When the third period following the second period arrives as the pedal is continuously pressed, the compression of the moving spring part 52 lasts while the piston part 20 is additionally moved, the compression of the mounting reaction part 30 lasts, and the support elastic part 44 is compressed by the moving support part 51 so as to generate a tertiary pedal force. The third period starts at the point of time that the support elastic part 44 is compressed (see FIG. 12).

The non-hydraulic pedal simulator 1 in accordance with the embodiment of the present disclosure may sequentially increase the reaction forces through the mounting reaction part 30, the support reaction part 40, and the moving reaction part 50 while the piston part 29 is moved as a driver presses the pedal. Thus, the non-hydraulic pedal simulator 1 may provide the driver with brake feeling similar to that generated by an existing hydraulic booster, even though an electronic booster is used.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A non-hydraulic pedal simulator comprising:
a housing part;
a piston part inserted into the housing part, and moveable in connection with a pedal rod part;
a mounting reaction part mounted on the piston part;
a support reaction part inserted into the housing part, disposed on a moving path of the mounting reaction part, and configured to support the mounting reaction part; and
a moving reaction part disposed between the piston part and the support reaction part, configured to elastically support the piston part, and supported by the support reaction part while being moved by the piston part,
wherein the mounting reaction part is configured to be movable by movement of the piston part in a movement direction of the piston part, and
the mounting reaction part is press-fitted into the piston part and exposed to an outside of the piston part, and made of an elastic material.

2. The non-hydraulic pedal simulator of claim 1, wherein the piston part comprises:
a piston body part inserted into the housing part;
a piston induction part extending from one side of the piston body part, wherein the pedal rod part is inserted into the piston induction part;
a piston mounting part extending from another side of the piston body part, wherein the mounting reaction part is inserted into the piston mounting part;
a piston sealing part mounted on a circumference of the piston body part, and configured to be in contact with the housing part; and
a piston stopper part mounted on the housing part, and configured to prevent separation of the piston body part.

3. The non-hydraulic pedal simulator of claim 1, wherein the support reaction part comprises:
a support base part embedded in the housing part;
a support rod part coupled to the support base part, and extending toward the mounting reaction part; and
a support plate part coupled to an end of the support rod part, and configured to support the mounting reaction part.

4. The non-hydraulic pedal simulator of claim 3, wherein the support rod part is insert-molded in the support base part.

5. The non-hydraulic pedal simulator of claim 3, wherein the support reaction part further comprises a support elastic part penetrated by the support rod part, press-fitted into the support base part, made of an elastic material, and configured to provide a reaction force.

6. The non-hydraulic pedal simulator of claim 1, wherein the moving reaction part comprises:
a moving support part moveable by pressing of the piston part; and
a moving spring part disposed between the moving support part and the support reaction part, and configured to support the moving support part by using a spring force.

7. A non-hydraulic pedal simulator comprising:
a housing part;
a piston part inserted into the housing part, and moveable in connection with a pedal rod part;
a mounting reaction part mounted on the piston part;
a support reaction part inserted into the housing part, disposed on a moving path of the mounting reaction part, and configured to support the mounting reaction part; and
a moving reaction part disposed between the piston part and the support reaction part, configured to elastically support the piston part, and supported by the support reaction part while being moved by the piston part;
a magnetic force generator disposed in any one or more of the pedal rod part, the piston part, or the moving reaction part, and configured to generate a magnetic force; and
a position detector mounted in the housing part, and configured to detect a position of the magnetic force generator,
wherein the mounting reaction part is configured to be movable by movement of the piston part in a movement direction of the piston part.

8. A non-hydraulic pedal simulator comprising:
a housing part;
a piston part inserted into the housing part, and moveable in connection with a pedal rod part;
a mounting reaction part mounted on the piston part;
a support reaction part inserted into the housing part, disposed on a moving path of the mounting reaction part, and configured to support the mounting reaction part; and
a moving reaction part disposed between the piston part and the support reaction part, configured to elastically support the piston part, and supported by the support reaction part while being moved by the piston part, wherein the mounting reaction part is configured to be movable by movement of the piston part in a movement direction of the piston part, and as the piston part is moved, the moving reaction part is pressed to generate a primary pedal force.

9. The non-hydraulic pedal simulator of claim 8, wherein as the piston part is additionally moved, the support reaction part presses the mounting reaction part to generate a secondary pedal force.

10. The non-hydraulic pedal simulator of claim 9, wherein as the piston part is still further moved, the moving reaction part presses the support reaction part to generate a tertiary pedal force.

11. A non-hydraulic pedal simulator comprising:
a housing part;
a piston part inserted into the housing part, and moveable in connection with a pedal rod part;
a mounting reaction part mounted on the piston part;
a support reaction part inserted into the housing part, disposed on a moving path of the mounting reaction part, and configured to support the mounting reaction part; and
a moving reaction part disposed between the piston part and the support reaction part, configured to elastically support the piston part, and supported by the support reaction part while being moved by the piston part,
wherein the support reaction part comprises:
a support base part embedded in the housing part;
a support rod part coupled to the support base part, and extending toward the mounting reaction part; and
a support plate part coupled to an end of the support rod part, and configured to support the mounting reaction part.

12. The non-hydraulic pedal simulator of claim 11, wherein the support rod part is insert-molded in the support base part.

13. The non-hydraulic pedal simulator of claim 11, wherein the support reaction part further comprises a support elastic part penetrated by the support rod part, press-fitted into the support base part, made of an elastic material, and configured to provide a reaction force.

14. The non-hydraulic pedal simulator of claim 11, wherein as the piston part is moved, the moving reaction part is pressed to generate a primary pedal force,
as the piston part is additionally moved, the support reaction part presses the mounting reaction part to generate a secondary pedal force, and
as the piston part is still further moved, the moving reaction part presses the support reaction part to generate a tertiary pedal force.

15. A non-hydraulic pedal simulator comprising:
a housing part;
a piston part inserted into the housing part, and moveable in connection with a pedal rod part;
a mounting reaction part mounted on the piston part;
a support reaction part inserted into the housing part, disposed on a moving path of the mounting reaction part, and configured to support the mounting reaction part; and
a moving reaction part disposed between the piston part and the support reaction part, configured to elastically support the piston part, and supported by the support reaction part while being moved by the piston part,
wherein the piston part comprises:
a piston body part inserted into the housing part;
a piston induction part extending from one side of the piston body part, wherein the pedal rod part is inserted into the piston induction part;
a piston mounting part extending from another side of the piston body part, wherein the mounting reaction part is inserted into the piston mounting part;
a piston sealing part mounted on a circumference of the piston body part, and brought into contact with the housing part; and
a piston stopper part mounted on the housing part, and configured to prevent separation of the piston body part.

16. The non-hydraulic pedal simulator of claim 15, wherein the mounting reaction part is press-fitted into the piston part and exposed to an outside of the piston part, and made of an elastic material.

17. The non-hydraulic pedal simulator of claim 15, wherein the moving reaction part comprises:
a moving support part moveable by pressing of the piston part; and
a moving spring part disposed between the moving support part and the support reaction part, and configured to support the moving support part by using a spring force.

18. The non-hydraulic pedal simulator of claim 15, further comprising:
a magnetic force generator disposed in any one or more of the pedal rod part, the piston part, or the moving reaction part, and configured to generate a magnetic force; and
a position detector mounted in the housing part, and configured to detect a position of the magnetic force generator.

19. The non-hydraulic pedal simulator of claim 15, wherein as the piston part is moved, the moving reaction part is pressed to generate a primary pedal force,
as the piston part is additionally moved, the support reaction part presses the mounting reaction part to generate a secondary pedal force, and
as the piston part is still further moved, the moving reaction part presses the support reaction part to generate a tertiary pedal force.

* * * * *